No. 664,337. Patented Dec. 18, 1900.
A. SCHULZE.
GOVERNOR FOR WATER WHEELS.
(Application filed Mar. 20, 1899.)
(No Model.) 10 Sheets—Sheet 6.
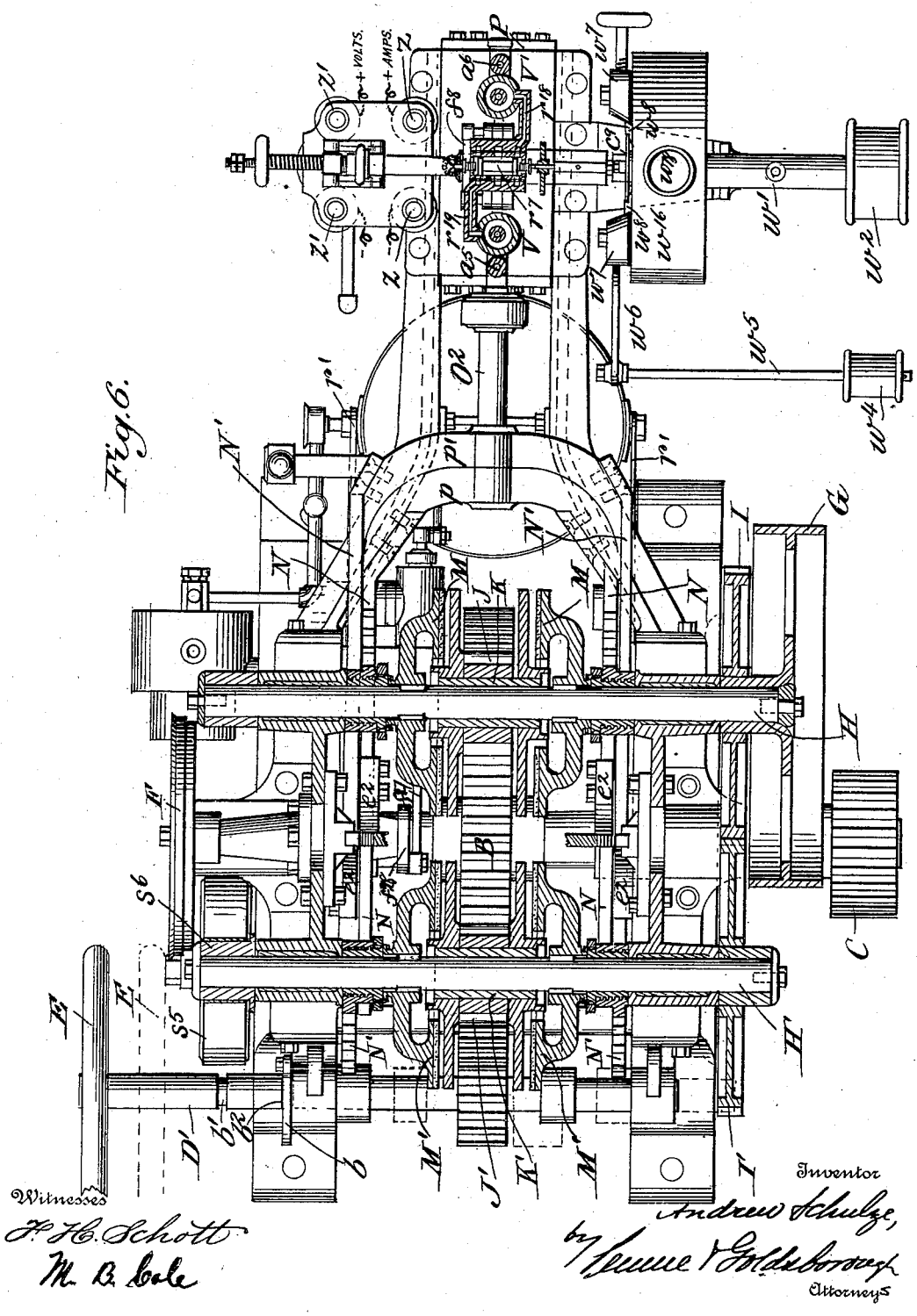

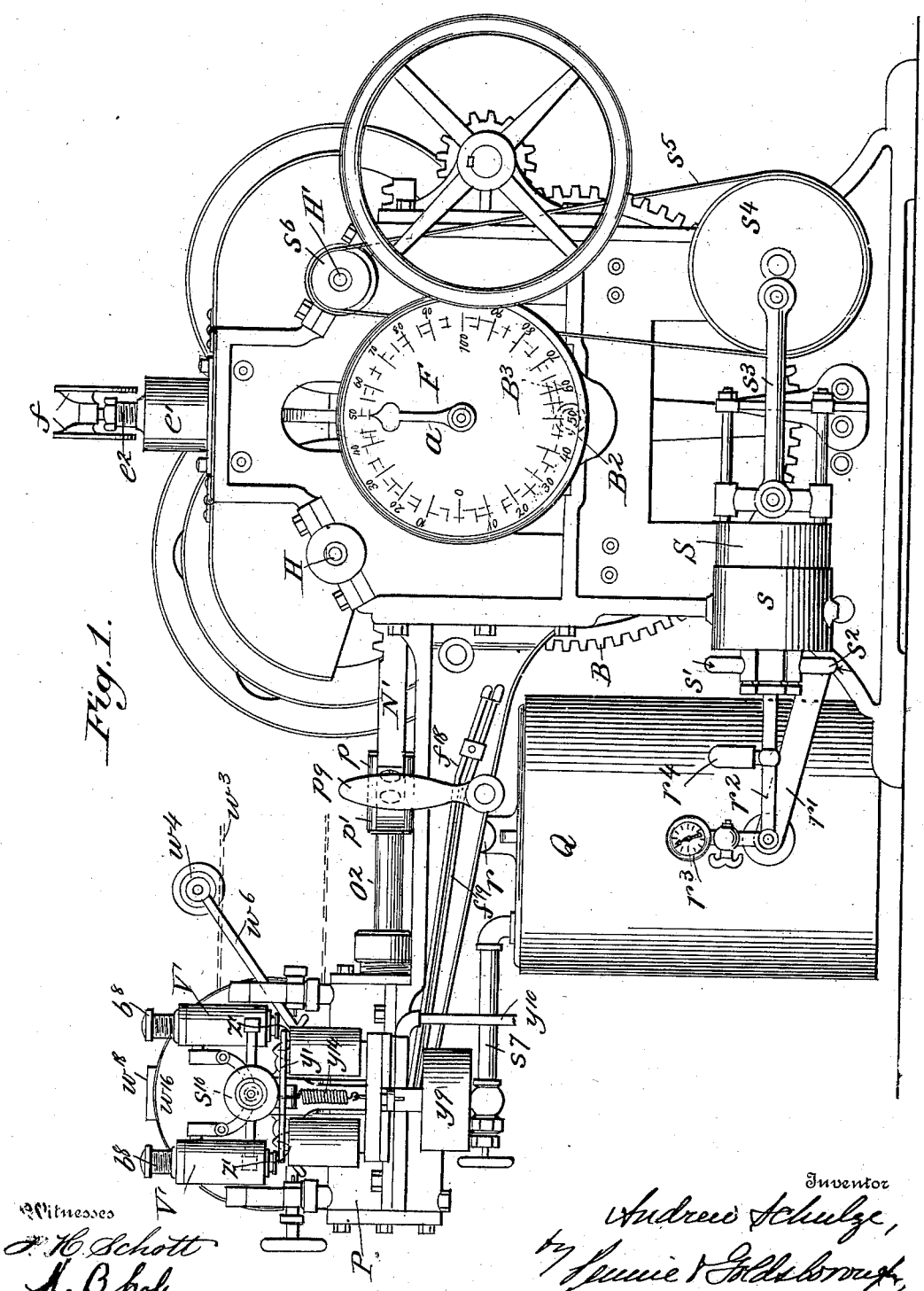

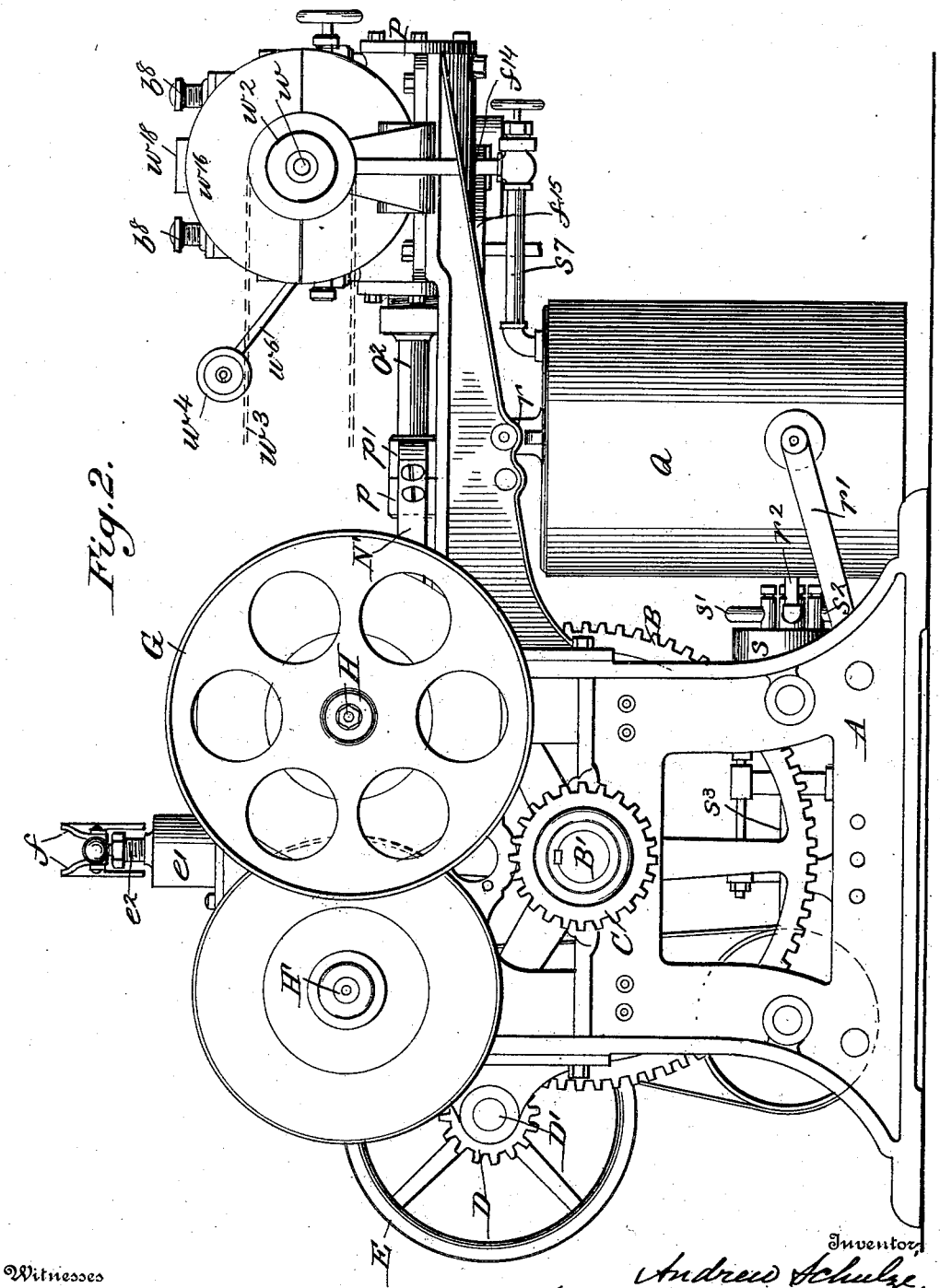

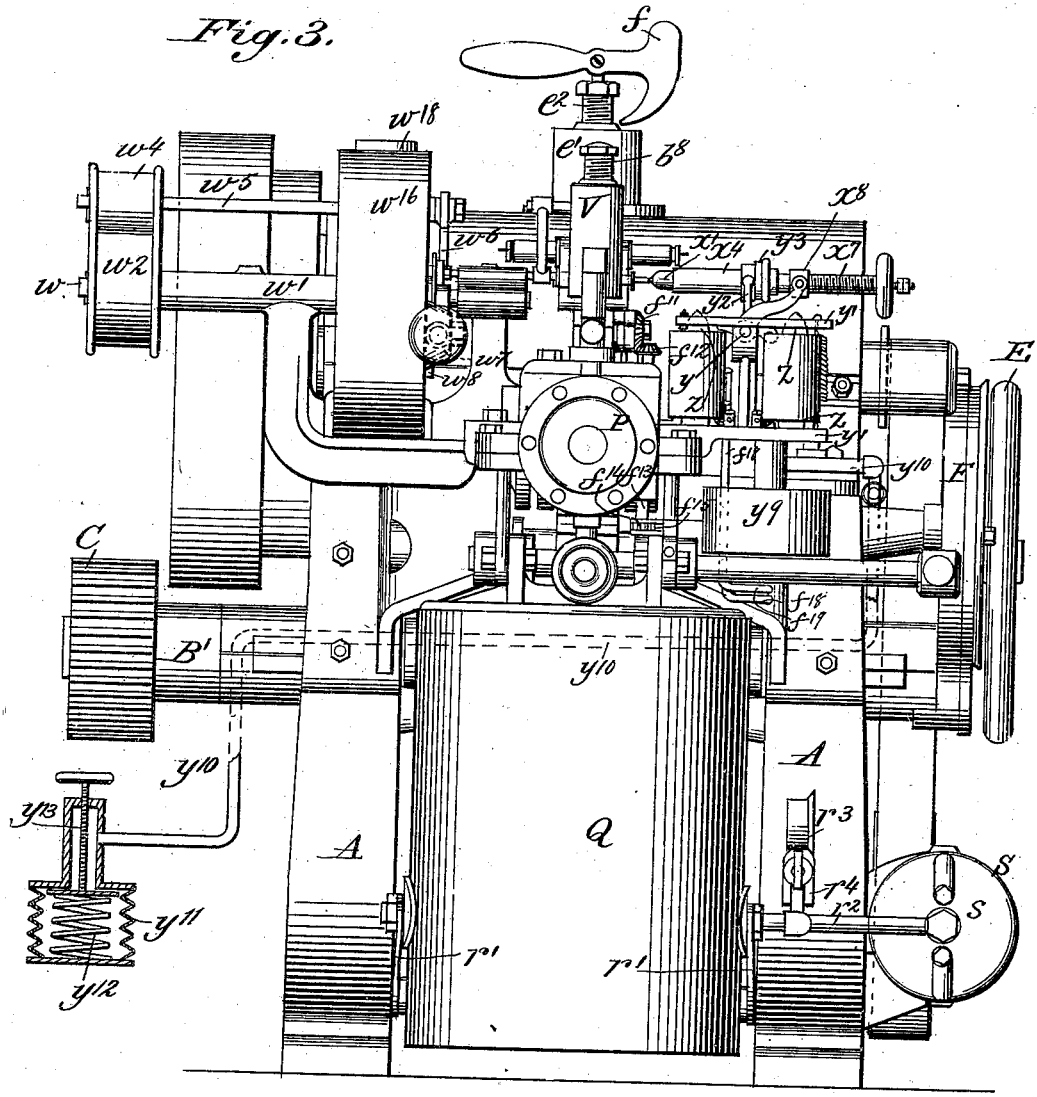

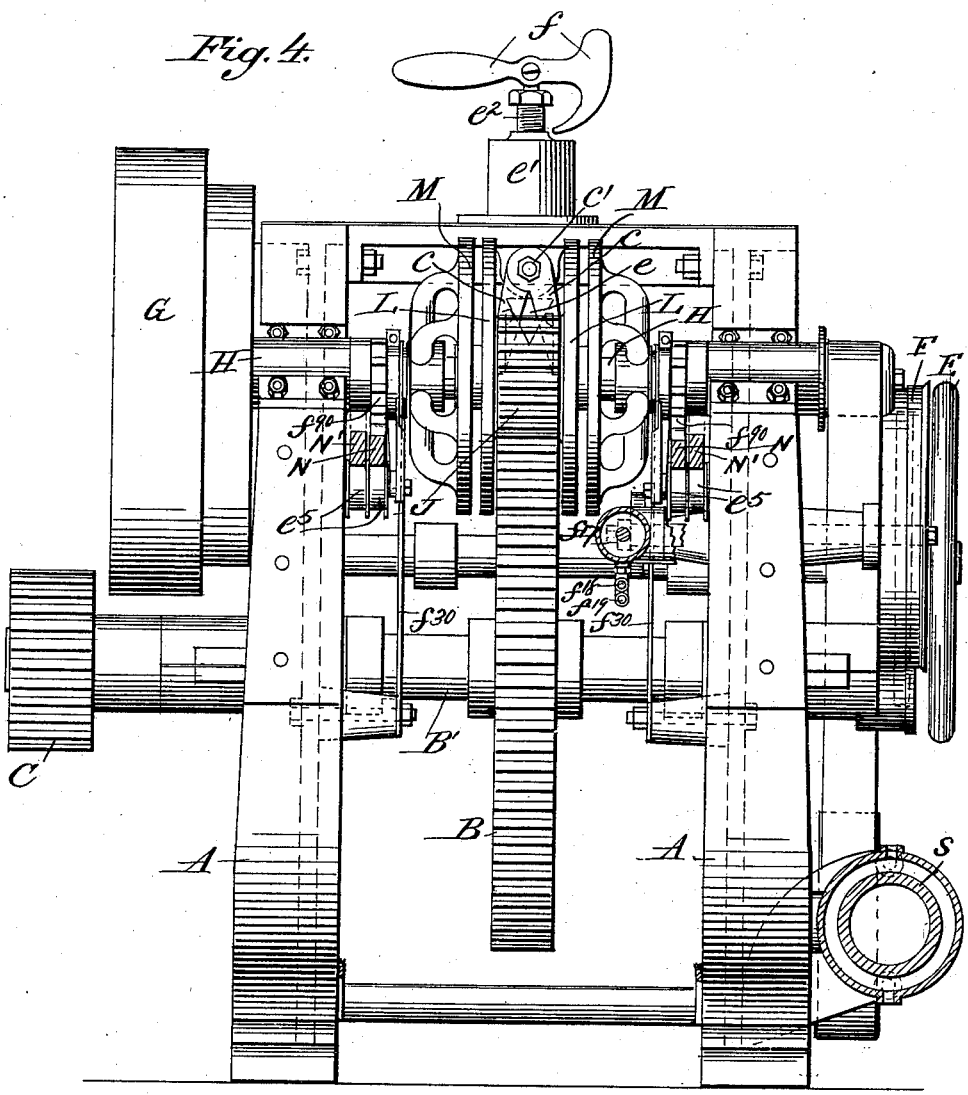

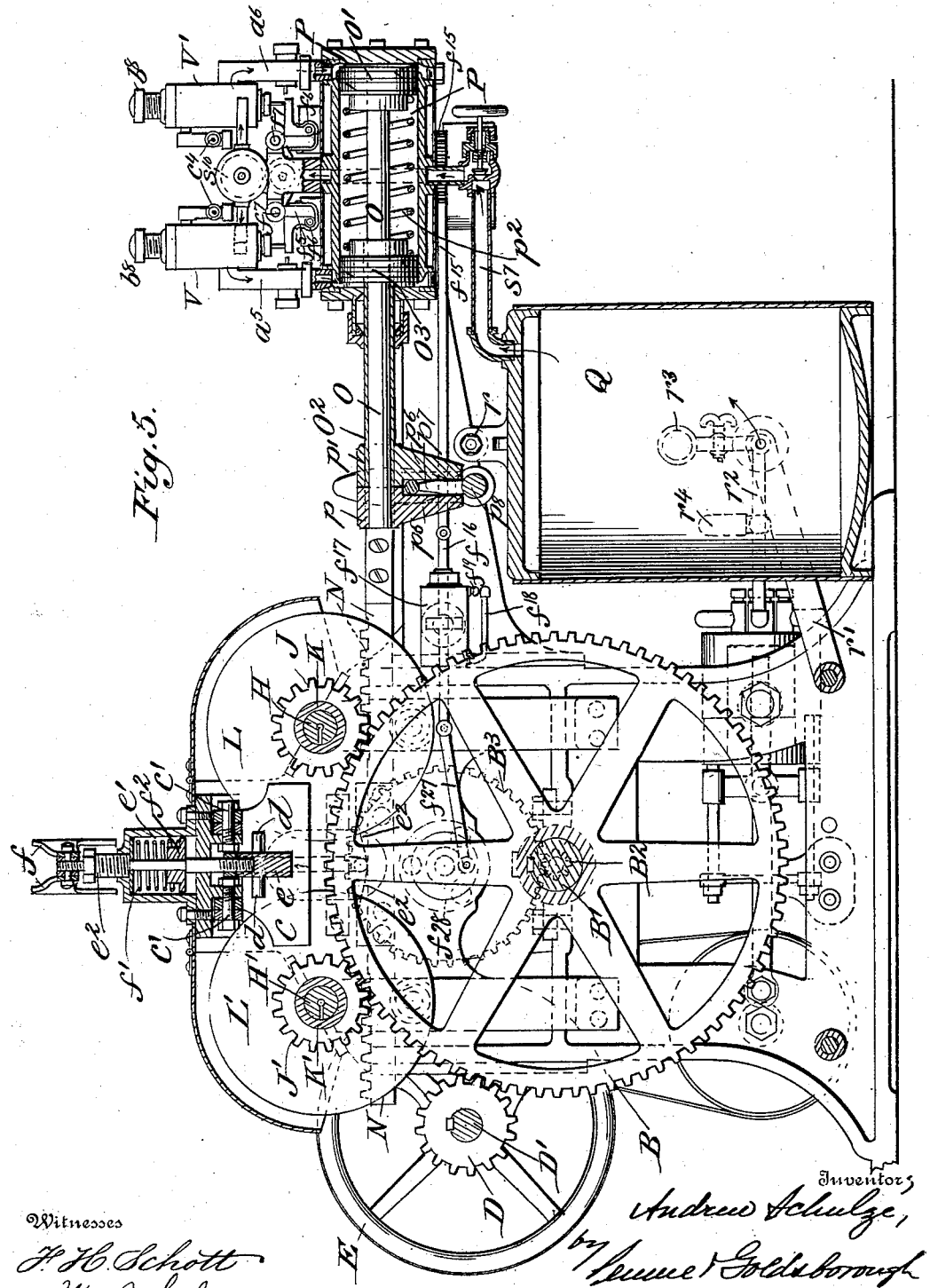

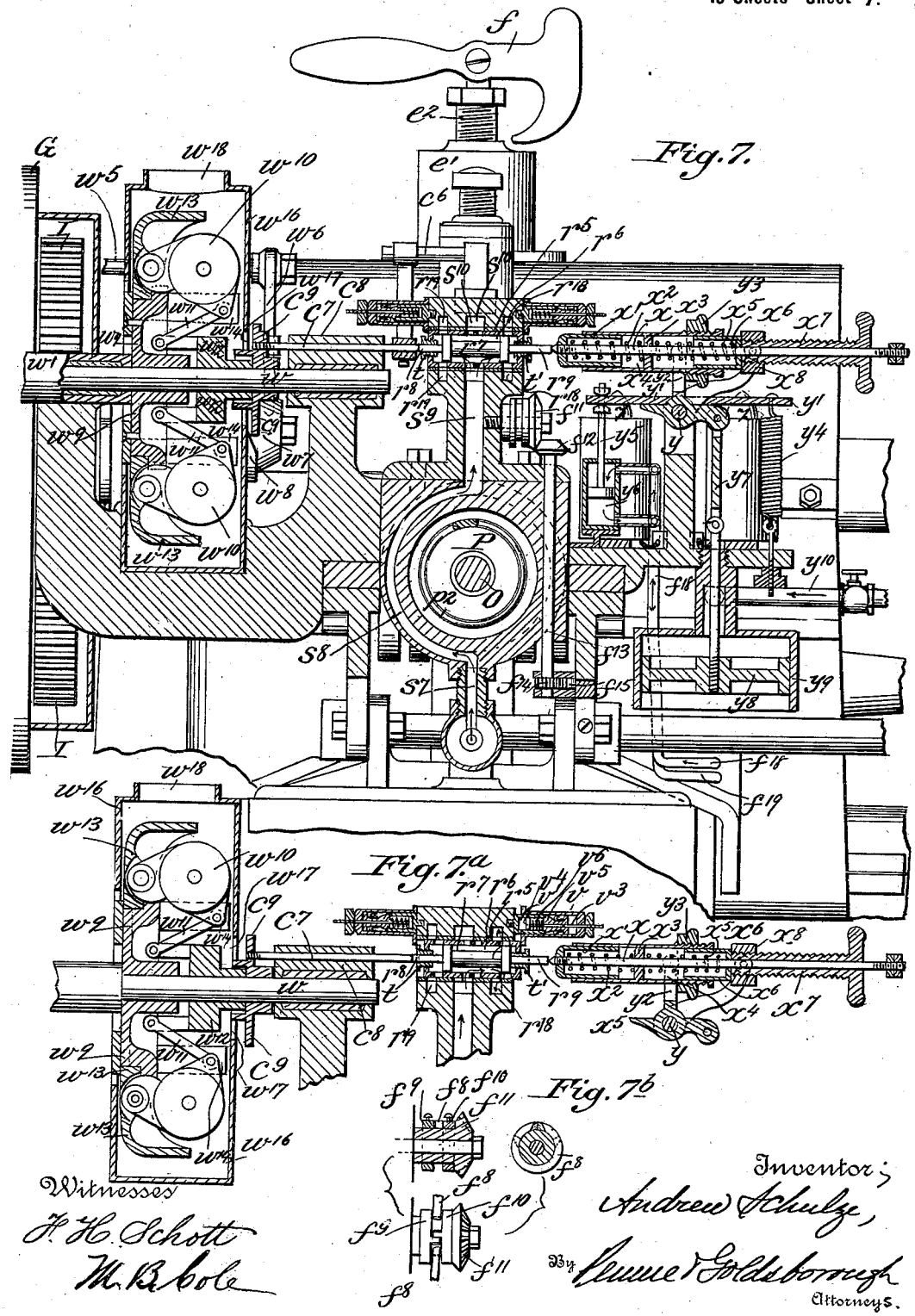

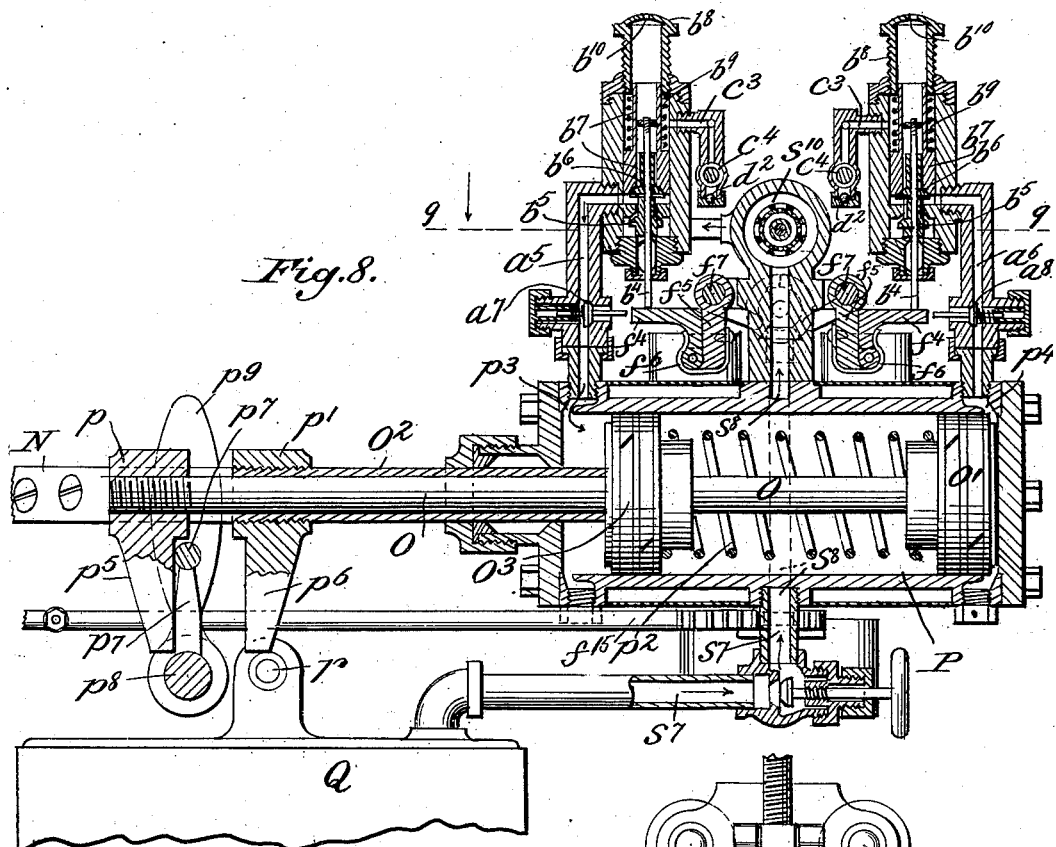
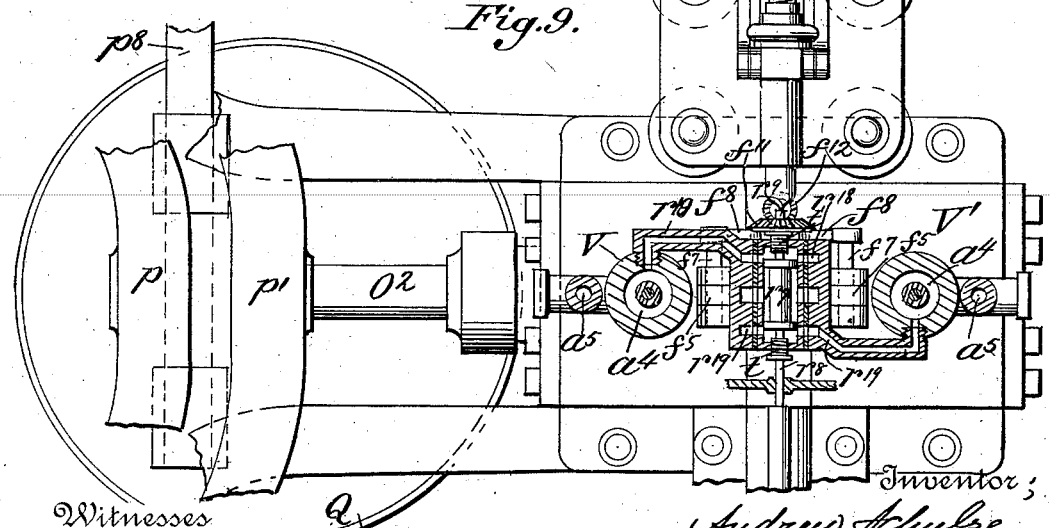

No. 664,337. Patented Dec. 18, 1900.
A. SCHULZE.
GOVERNOR FOR WATER WHEELS.
(Application filed Mar. 20, 1899.)
(No Model.) 10 Sheets—Sheet 9.
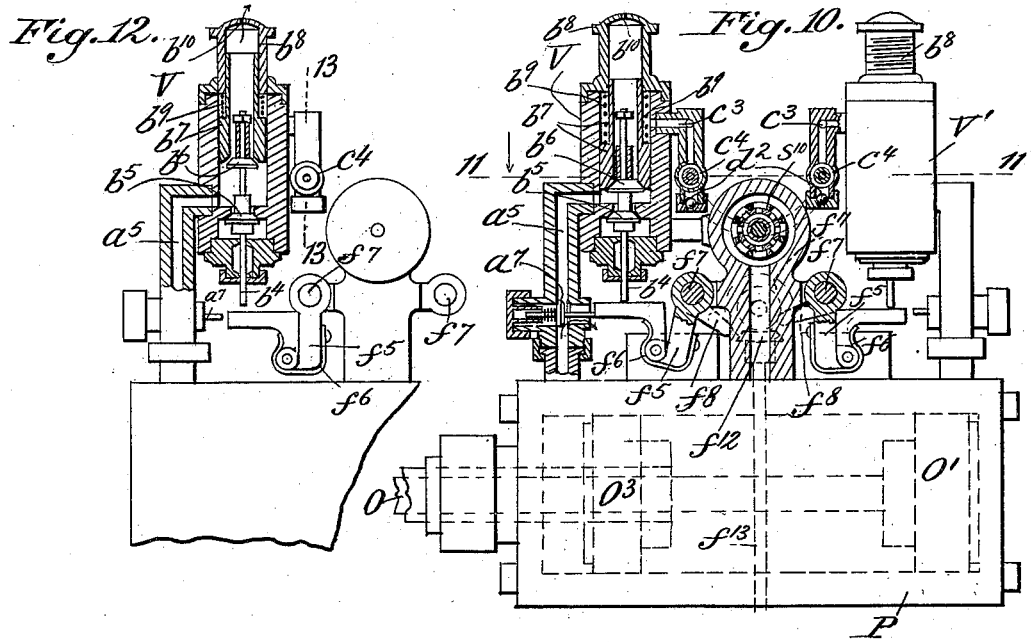
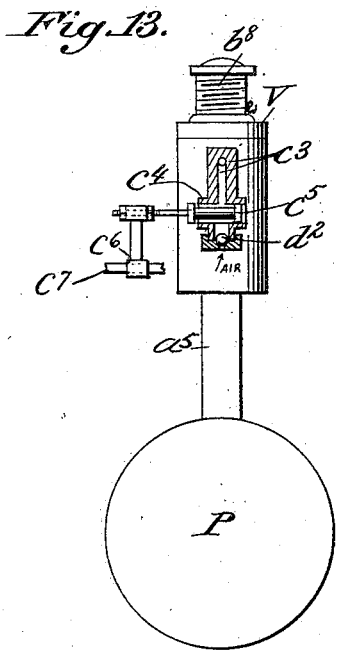
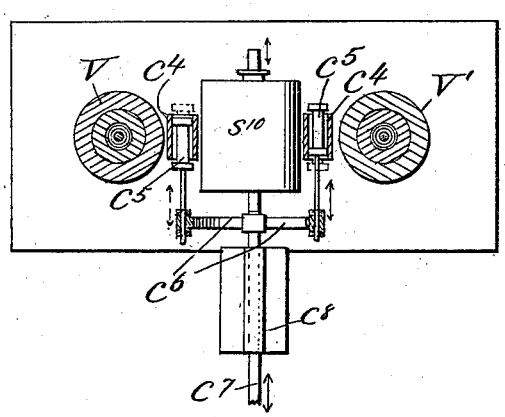
Witnesses
F. H. Schott
M. B. Cole
Inventor
Andrew Schulze,
By Jennie V. Goldsborough.
Attorneys

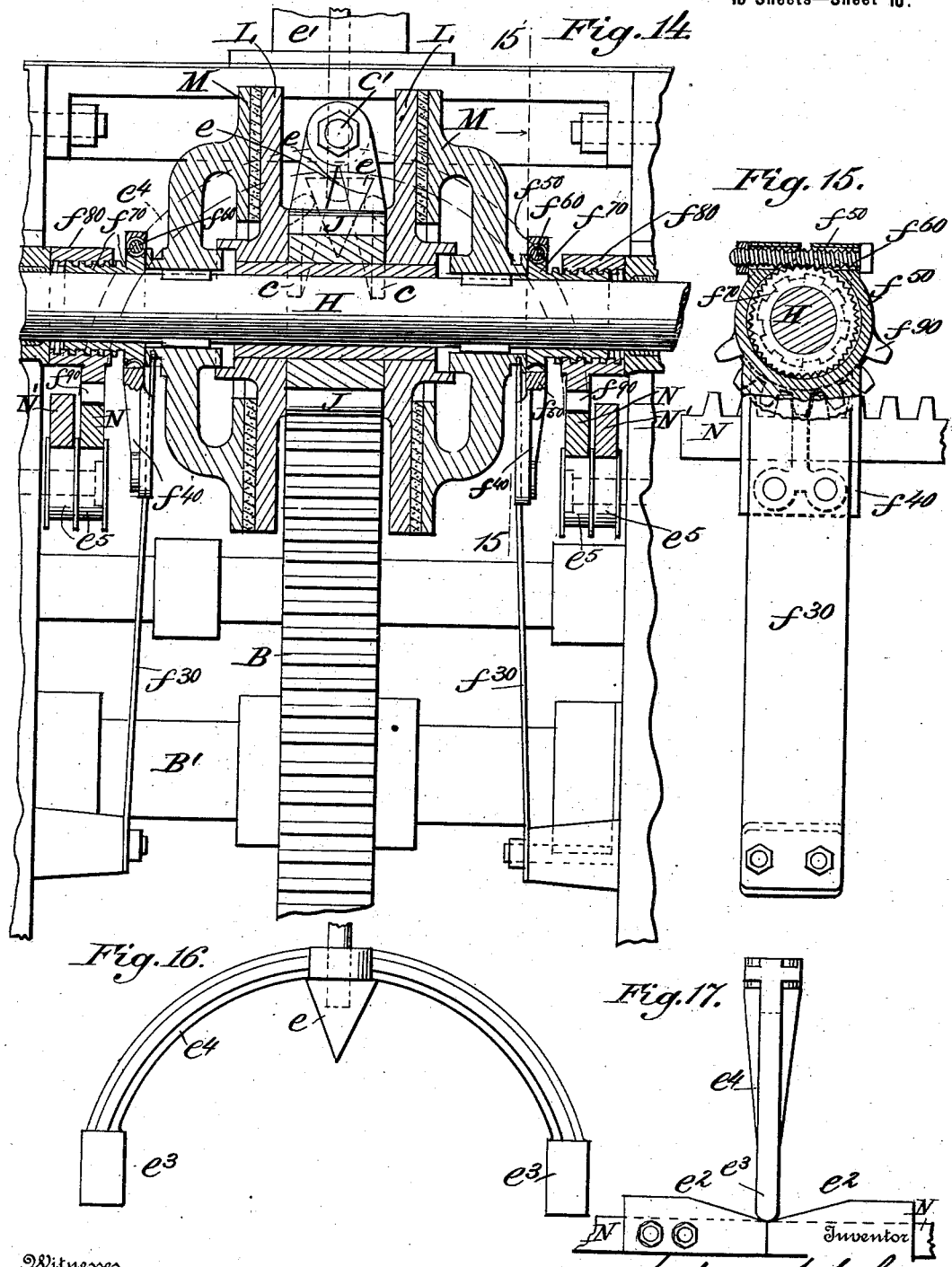

UNITED STATES PATENT OFFICE.

ANDREW SCHULZE, OF WASHINGTON, DISTRICT OF COLUMBIA, ASSIGNOR OF ONE-HALF TO EMMA S. DOUGLAS, OF ST. LOUIS, MISSOURI.

GOVERNOR FOR WATER-WHEELS.

SPECIFICATION forming part of Letters Patent No. 664,337, dated December 18, 1900.

Application filed March 20, 1899. Serial No. 709,847. (No model.)

*To all whom it may concern:*

Be it known that I, ANDREW SCHULZE, a citizen of the United States, residing in the city of Washington, District of Columbia, have invented certain new and useful Improvements in Governors for Water-Wheels; and I do hereby declare the following to be a full, clear, and exact description of the invention, such as will enable others skilled in the art to which it appertains to make and use the same.

My invention relates to certain new and useful improvements in governors adapted particularly for employment in connection with water-wheels for the purpose of regulating the flow of water to the wheel in accordance with the varying demands of the machinery driven from the wheel. Many of the features of the invention, however, are capable of use generally wherever it is desired to maintain a constant speed by governing the supply of motive fluid to the machine driven thereby—as, for instance, for governing the speed of a steam-engine at a central station by acting upon the throttle-valve of the steam-supply conduit, so as to maintain a constant speed for the steam-engine and the electric generators driven thereby.

In the accompanying drawings, Figure 1 represents a front side elevation of a governor embodying my improvements. Fig. 2 represents a rear side elevation thereof. Fig. 3 represents an end view. Fig. 4 represents a like view as Fig. 3, but with the valve-gear removed. Fig. 5 represents a longitudinal vertical section. Fig. 6 represents a horizontal section. Fig. 7 represents an enlarged cross-section taken through the valve-gear and shows the relation of the parts at normal speed. Fig. 7$^a$ represents the location of certain of the parts shown in Fig. 7 when the machine is running at high speed. Fig. 7$^b$ represents in longitudinal section, cross-section, and side elevation the automatic gate-stop. Fig. 8 represents in vertical section the power-cylinder and its adjuncts for throwing the governor into operation to open or close the gate, the parts being shown in position to close the gate when the machine is operating at high speed. Fig. 9 represents a plan view thereof, partly in section. Fig. 10 represents a like view, partly in elevation, and illustrates the action of the automatic gate-stop. Fig. 11 represents a sectional view on the line 11 11 of Fig. 10. Fig. 12 represents in section the operation of the relief-valve or pop-valve constituting one of the elements of the structure. Fig. 13 represents a section and partial elevation on the line 13 13, Fig. 12. Fig. 14 represents, on a larger scale, partly in longitudinal section and partly in elevation, the friction-clutches and the immediate devices for throwing them into and out of action. Fig. 15 represents a section on the line 15 15 of Fig. 14. Fig. 16 represents a side elevation of the wedge employed for preventing the rotation of the inner set of friction-disks when the governor is out of action—*i.e.*, when it is neither engaged in opening nor shutting down the gate. Fig. 17 represents an end view thereof, together with the inclines for operating it.

Similar letters of reference indicate similar parts throughout the several views.

Referring to the drawings, A indicates suitable castings or standards within which the several shafts are journaled, said standards being connected by appropriate cross bolts and braces and being provided with brackets, as shown, so as to constitute therewith the supporting-framework for the operating parts.

B indicates a gate gear or pinion fixed upon a shaft B' and adapted to actuate the water-gate, throttle-valve, or the like—for instance, through the intermediacy of the pinion C, fixed to the outer end of the shaft B'. Meshing with the gear B is a pinion D, splined to the shaft D', which shaft is provided with the hand-wheel E, whereby the gate may be manually opened or closed in case of emergency or when otherwise desired. The shaft D' is adapted to be shifted longitudinally, as indicated in dotted lines in Fig. 6, so as to throw the gear D out of engagement with the gear B, if desired, and a hinged gravity-latch $b$ is provided for maintaining the shaft D' in the one adjustment or the other by engaging with a corresponding groove $b'$ or $b^2$, as the case may be. The shaft B' is likewise provided with a pinion B$^2$, engaging with a gear B$^3$, said latter gear being fixed to a shaft to which a pointer $a$ is attached, said pointer moving over a graduated disk F, thereby indicating the position of the gate.

The governor derives its power from a driving-pulley G, fixed upon a shaft H and carrying a gear I, which meshes with a gear I' upon a shaft H'. The shaft H carries a pinion J, mounted upon a sleeve K, said sleeve being loose upon the shaft H. The shaft H' in like manner carries a pinion J', mounted upon a sleeve K', which is loose upon said shaft H'. The pinions J and J' intermesh with the gear B; but inasmuch as they are normally at rest they do not impart movement to the gear B nor to the gate and are not brought into operation until either the one or the other is clutched upon its corresponding shaft by the devices hereinafter to be described.

In order to prevent the pinions J and J' from receiving any movement of rotation, except when it is desired to positively clutch the one or the other to its shaft for purposes of opening or closing the gate, I provide two wings $c$, having lugs from which they are suspended to swing upon bolts $c'$, said wings serving to act as brakes when brought into contact with the flat surface of disks L L', which disks are fixed upon the same sleeves upon which the pinions J J' are mounted. Upon the inner faces of the wings $c$ are the projections $d$, and above said projections is located a wedge $e$, having a stem which passes upwardly through a chamber $e'$ and hollow nut $e^2$ and which is connected at its upper end to the pivoted hand-lever $f$, so that when the hand-lever is turned at right angles to the position which it occupies in the drawings the wedge will be raised entirely out of operative position. When the hand-lever is in the horizontal position indicated in the drawings, with its cam-surfaces released from contact with the chamber $e'$, a spring $f'$, acting against a washer $f^2$ upon the stem of the wedge, will force the wedge down between the projections $d$, and will thereby force the wings $c$ into frictional contact with the disks L L', thereby preventing them from rotating with their shafts, and consequently preventing the rotation of the corresponding pinions J J'.

Splined upon the shafts H H' are the friction-disk clutches M M', said friction-disk clutches being thereby caused to rotate continuously with their shafts, but having a capability of longitudinal movement thereon. The inner or contact faces of the friction-disk clutches M M' are preferably provided with a layer of vulcanized fiber or any other material softer than the metal body portion of the disk, which may be removed and replaced when occasion requires. Except when positively brought into contact with the corresponding disks L and L' by the governor devices, hereinafter set forth, the disks M M' are held retracted therefrom in order that they may not transmit motion to either of the pinions J J'. To this end the hub of each of the disks M M' is provided with a groove in which engages a leaf-spring $f^{30}$, the lower end of said spring being secured to a projection from the framework, as shown more fully in Figs. 14 and 15. The tendency of the spring is to draw the disks M M' away from engagement with the disks L L'. Near their upper ends the springs $f^{30}$ are bolted or riveted to a lug $f^{40}$, projecting downwardly from a split clamping-ring $f^{50}$, which is adapted to be clamped tightly by means of the worm $f^{60}$, which also meshes with a worm-gear formed on the periphery of the head of the screw $f^{70}$. The screw $f^{70}$ engages with an internal screw-thread of the socket $f^{80}$, which is held against longitudinal movement, but is adapted to rock in a vertical plane, thereby causing the nut $f^{70}$ to move inwardly or outwardly, as the case may be, to release or to engage the clutch. The socket $f^{80}$ is provided on its under surface with cogs $f^{90}$, the cogs of each socket being adapted to engage with a corresponding rack-bar, as shown. It is evident that by turning the worm $f^{60}$ a relative adjustment between the screw $f^{70}$ and the socket $f^{80}$ can be obtained to compensate for any wear on the faces of the friction clutch-disks, and that when the rack-bars of either set of sockets are moved the sockets will be correspondingly revolved, so as to cause the screws $f^{70}$ to advance or recede with respect to the friction clutch-disks. The function of the spring $f^{30}$ is also to prevent the screw $f^{70}$ from rotating under the action of the socket $f^{80}$ and insures its movement in a straight longitudinal path.

The racks for engaging with the teeth $f^{90}$ of the socket $f^{50}$ are arranged in two pairs N N and N' N'. The racks N N are geared, respectively, to the sockets carried by the shaft H, and the racks N' N' are geared to the sockets carried by the shaft H'. The racks N are connected by a cross-head $p$, which cross-head is fixed to a piston-rod O, which bears at its opposite end the fixed piston-head O'. The racks N' are connected by a cross-head $p'$, which is fixed to a sleeve $O^2$, said sleeve bearing at its opposite end the piston-head $O^3$. The piston heads referred to work within a cylinder P and are normally held apart by a coiled spring $p^2$ within the cylinder. The cylinder (see Fig. 8) is provided with inlet-ports $p^3 p^4$, which ports also serve as exhaust-ports therefor, as will hereinafter more fully appear. It may be stated, further, that each of the racks, as indicated more fully in Figs. 5, 6, 16, and 17, is provided with inclines $e^2$, adapted to engage the lower ends $e^3$ of the arch $e^4$, which carries the wedge $e$, so that when either pair of racks moves to apply the friction clutch-disks the wedge $e$ will be lifted from engagement with the projections $d$ and will thereby release the pivoted wings $c$ from contact with the disks L L'. The racks are supported upon flanged antifriction-rollers $e^5$, as indicated in Fig. 14. In order to test by hand the condition of the racks and their adjuncts, I may provide the cross-heads $p$ $p'$ with depending lugs $p^5$ $p^6$ abutting against a crank-arm $p^7$ upon rock-shaft $p^8$, which rock-shaft is provided with an operating-handle $p^9$. (See Fig. 8.)

The cylinder P is adapted to be operated from a supply-reservoir Q of compressed air suspended at $r$ from a bracket of the frame and held at its lower portion by the links $r'$. The reservoir Q receives its supply of compressed air through a pipe connection $r^2$, having the usual gage $r^3$ and safety-valve $r^4$, said pipe connection $r^2$ being provided with a check-valve to prevent backflow from the reservoir. It communicates with the interior of the pump-cylinder S, having a water-jacket $s$, said pump-cylinder being provided with air-intakes $s'$ $s^2$, having the usual inwardly-opening check-valves, as will be well understood by those skilled in the art. The piston of the air-pump S is operated by a pitman $s^3$, driven by the disk $s^4$, which receives a continuous movement of rotation through the intermediacy of the band $s^5$ from a band-wheel $s^6$ upon the shaft H'. By an appropriate adjustment of the safety-valve $r^4$ the desired pressure of air may be obtained within the storage-receptacle Q, as will be understood.

From the storage-receptacle Q a conduit $s^7$ leads to a channel $s^8$, cored out in the walls of the cylinder P and through a channel $s^9$ into an axial space $s^{10}$, which surrounds two concentric shells $r^5$ $r^6$, having perforations, as shown, constituting inlet-ports for the admission of compressed air. The shell $r^6$ constitutes a valve-chamber and contains a double-headed piston-valve $r^7$, provided with stems $r^8$ $r^9$, which project through hollow nuts $t$ $t'$. It will be evident that by adjusting the nuts $t$ $t'$ to a greater or less distance within the valve-chamber $r^6$ the play of the piston-heads of the valve $r^7$ before striking the inner ends of said nuts can be correspondingly determined. The valve-chamber $r^6$, as indicated in Figs. 7 and 7ª, is movable within the outer shell $r^5$, but is normally held in the central position shown in Fig. 7 by means of centering devices, which may conveniently consist of a cap $v$, fitting over a hollow plug $v'$ and having a stem $v^3$, said stem passing into the interior of the hollow plug and being provided with a collar $v^4$, between which and the head $v^5$ of the plug is located a spiral spring $v^6$. The tendency of the spring is to draw the cap $v$ inwardly, and the cap is provided with a flange in the path of movement of the valve-chamber $r^6$, so that when the valve-chamber $r^6$ moves in the one direction or the other it puts a tension upon the corresponding centering device, which centering device returns the valve-chamber to its original position when the force which moves it is withdrawn.

The valve-chamber $r^6$ and the piston-valve $r^7$ jointly control the passage of the compressed air to one or the other of the outlet-ports $r^{18}$ $r^{19}$, which lead, respectively, into the lower chambers $a^4$ of the relief or pop valves V V', the construction of said pop-valves being identical with each other. From the pop-valves channels $a^5$ $a^6$ lead, respectively, to the ports $p^3$ $p^4$ of the cylinder P, each of said channels $a^5$ $a^6$ being provided with a spring-seated valve $a^7$ $a^8$, governing an exhaust-port to the open air. Each pop-valve is provided with a stem $b^4$, having fixed thereon a valve $b^5$ and carrying also a loose valve $b^6$, upon which rests a loose sleeve $b^7$, having a shoulder, between which and the adjustable screw-threaded cap $b^8$ is interposed a spring $b^9$. The cap $b^8$ is perforated at $b^{10}$, and the spring encircling the upper portion of the sleeve $b^7$ communicates through a channel $c^3$ with a cylindrical chamber $c^4$, whose ends are normally closed by a double-headed piston $c^5$, connected to a cross-head $c^6$, carried by a longitudinal shiftable rod $c^7$. (See Figs. 7, 11, and 13.) The rod $c^7$ passes through a guide $c^8$ and is secured at its opposite end within a sliding sleeve or collar $c^9$, loose upon the driving-shaft $w$ of the centrifugal governor. Below the pistons $c^5$ the chamber $c^4$ is provided with an air-inlet opening (see Fig. 13) having a spherical valve $d^2$. Beneath the stems $b^4$ of the pop-valves and opposite the ends of the stems of the valves $a^7$ $a^8$ are arranged the valve-trippers $f^4$, pivoted to the arms $f^5$ and normally held in the position indicated in Fig. 8 by means of the springs $f^6$. Each arm $f^5$ is fixed upon a shaft $f^7$, and the shafts are provided with projections $f^8$, whose free ends engage within the space between two collars $f^9$ $f^{10}$, (see Fig. 7ᵇ,) adjustable by means of set-screws, as shown, upon the shank of a gear-wheel $f^{11}$. The gear-wheel $f^{11}$ meshes with a gear $f^{12}$, fixed upon a shaft $f^{13}$, and the shaft $f^{13}$ carries a pinion $f^{14}$ at its lower end, which pinion engages with a rack $f^{15}$, connected at its opposite end to the piston-rod $f^{16}$ of a cylinder $f^{17}$. The cylinder $f^{17}$ contains heavy oil and is provided with pipes $f^{18}$ $f^{19}$, opening into the cylinder on opposite sides of the piston. The piston-rod $f^{27}$ connects with a disk $f^{28}$, fixed upon the indicator-shaft, and consequently moves with the gate-shaft. It is evident that when the gate-shaft is rotated in either direction one or the other of the tripping-arms $f^4$, as the case may be, will be thrown into the position indicated in Fig. 10, thereby raising and seating the pop-valves and unseating the valve $a^7$ or $a^8$.

The stem $r^8$ of the piston $r^7$ is held constantly against the end of the rod $c^7$ by means of the reaction of a spring-seated rod $x$, which bears against the end of the stem $r^9$. The rod $x$ is provided with a screw-thread, upon which is screwed a cap $x'$, and a spring $x^2$ is interposed between the cap and a partition $x^3$ in a tube $x^4$, through which the stem passes, so that the tendency of the spring $x^2$ is to force the rod $x$ against the end of the stem $r^9$. On the other side of the partition $x^3$ is a spring $x^5$, which reacts between the said partition and the base of the sliding socket $x^6$. A screw $x^7$, passing through a collar $x^8$, bears against the socket $x^6$, so that by adjusting the screw $x^7$ the tension of the spring $x^5$ can be correspondingly varied, and consequently the tension of the spring $x^2$.

Upon a rock-pin $y$ (see Fig. 7) is mounted a rocking arm, to which is secured a plate $y'$, having forked projections $y^2$, which bear against a collar $y^3$ upon the tube $x^4$. A spiral spring $y^4$ is connected to one end of the plate $y'$ and the other end of said plate is connected with a piston-rod $y^5$, working within a cylinder $y^6$, whose opposite ends communicate, respectively, with the pipes $f^{18} f^{19}$, leading to the oil-cylinder $f^{17}$, hereinbefore described. It is therefore evident that as the gate-shaft moves in the one direction or the other the piston in the cylinder $y^6$ will have a corresponding movement, which movement will be communicated to the tube $x^4$, and consequently to the stem $x$. A link $y^7$ connects the rock-plate $y'$ with a piston $y^8$, adapted to move within a cylinder $y^9$, said cylinder being provided with a pipe $y^{10}$, which leads to a bellows-like chamber $y^{11}$, located in the penstock below the level of the water, preferably where the fluctuation in pressure is the greatest—for instance, in the vicinity of the waterwheel. The chamber $y^{11}$ may rest on the bottom of the penstock and is provided with a spiral spring $y^{12}$, whose tension is adjustable by means of the screw-threaded stem $y^{13}$, so that if the pressure of water in the penstock increases the chamber $y^{11}$ will partially collapse correspondingly and so that if the pressure in the penstock decreases the chamber $y^{11}$ will expand correspondingly. If the chamber $y^{11}$ partially collapses, the piston $y^8$ will be driven downwardly, and if the chamber $y^{11}$ expands the piston $y^8$ will be correspondingly raised, as will be readily understood.

The collar $c^9$, to which the stem $c^7$ is attached, is adapted to be operated from a centrifugal governor, the preferred form of which is illustrated herein, but whose specific construction is claimed in a separate application filed by me of even date herewith. The governor-stem $w$ passes through a journal $w'$ and is provided with a belt-pulley $w^2$, driven by a belt $w^3$ from the machine to be governed. An idle roller $w^4$ upon the stem $w^5$ rests upon the belt and is connected by an arm $w^6$ to a revoluble base $w^7$, having a cam-incline $w^8$. The purpose of this construction is that should the belt break the cam $w^8$ would be immediately introduced behind the collar $c^9$ and would force said collar outwardly, carrying with it the piston $r^7$, so as to at once shut down the gate.

Upon the stem $w$ is secured the disk $w^9$, said disk rotating with the shaft. The disk $w^9$ drives the pivoted weights $w^{10}$, which weights are connected by the links $w^{11}$ with a sliding collar $w^{12}$, said collar being adapted to act against the collar $c^9$. The weights $w^{10}$ are pivoted within an annular disk $w^{13}$, mounted within a groove of the disk $w^9$, said disk $w^{13}$ being furthermore provided with fan-blades $w^{14}$. The centrifugal governor thus constituted is inclosed within a casing $w^{16}$, having an opening $w^{17}$, for which the collar $c^9$ serves as a valve to admit more or less air thereto, according to the position of the collar $c^9$.

It will be apparent that the shaft $w$ will drive the governor-weights $w^{10}$ through the intermediacy of the disk $w^9$ and that the disk $w^{13}$ will be driven at the same time. The weights $w^{10}$ are flat, and in conjunction with the wings $w^{14}$ will act as a fan, drawing air through the opening $w^{17}$ and expelling it through the opening $w^{18}$ of the casing, all as set forth more fully in my application of even date herewith, hereinbefore referred to.

The operation of the parts described is as follows: The driving-pulley G being belted to the machine is in constant rotation, as are also the gears I I' and the friction-clutch disks M M'. The air-pump operates constantly to maintain the compressed-air reservoir Q filled with air at the desired pressure established by the safety-valve. The governor-shaft $w$, driven from the machine to be governed, also rotates continuously, thereby separating the governor-balls $w^{10}$ to a distance varying with the speed of rotation of the shaft. Normally the parts are in the relative arrangement indicated in Fig. 7, the machine at that adjustment running at normal speed. Should the speed of the machine, and consequently of the governor-shaft $w$, increase, the effect would be to shift the parts into the position indicated in Fig. 7$^a$. The collar $c^9$ would advance the stem $c^7$, thereby carrying the valve $r^7$ toward the right and admitting air from the valve-chamber $r^6$ into the passage $r^{19}$. The compressed air from $r^{19}$ will thereupon pass the valve $b^5$ and enter by means of the passage $a^5$ through the port $p^3$ behind the piston $O^8$, thereby causing said piston to move toward the right, as indicated in Fig. 8. The sleeve $O^2$ will move with the piston, carrying with it the cross-head $p'$, carrying with it the racks N'. The racks N' will thereupon raise the wedge $e$ and at the same time will rotate the sockets $f^{80}$ of the shaft H'. Thereupon the friction-disk clutches M' will advance and will clutch the pinion J' to the shaft H'. The gate-gear B will therefore rotate to shut down the gate, the extent of movement being indicated as it progresses upon the face of the indicator F. When the pressure within the cylinder P is counterbalanced by the spring $p^2$, the reaction through the passage $a^5$ will cause the valve $b^6$ to rise, together with the sleeve $b^7$, until finally the valve $b^6$ will strike the upper part of the stem of the valve $b^5$, thereby raising the valve $b^5$ and shutting off further access of air for the time being. The sleeve $b^7$, continuing to rise will leave the valve $b^6$, whereupon the air in the cylinder will exhaust through the opening $b^{10}$, whereupon the valve parts will all return to their original position. Should normal speed not have been reëstablished, this action will be repeated intermittently and automatically. Immediately after the piston-valve $r^7$ has been shifted, as just described, the valve-casing $r^6$ is shifted, as shown in Fig. 7$^a$, so that whatever may be the extent of movement of the piston-valve the amount of air admitted into the passage $r^{19}$ shall not exceed a predetermined maximum. If the increase in speed to be compensated for has been so great as to separate the governor-weights sufficiently, the consequent movement of the rod $c^7$ will cause the corresponding valve $c^5$ to close the outlet of air from the cylinder $c^4$. Consequently a body of air will be imprisoned within the cylinder $c^4$ and will resist the upward movement of the sleeve $b^7$, thereby causing the said sleeve to rise more slowly and postponing correspondingly the release of the air from the cylinder P. The movement of the gate will be correspondingly prolonged in accordance with this slower rise of the sleeve $b^7$. As hereinbefore described, the movement of the gate will be accompanied by a corresponding rise or fall of the piston in the chamber $y^6$, so that as the gate shuts down the piston in the chamber $y^6$ will rise and will descend and will progressively increase the tension of the spring $x^2$ upon the stem $x$, and consequently upon the piston-valve $r^7$. In like manner an increase of pressure within the chamber $y^9$, due to a rise in pressure in the penstock, will act in like manner to increase the tension of the spring upon the piston-valve. This increase in pressure in the penstock always accompanies the closing down of the gate, and is thus utilized as a factor in the governing operation. It will be of course understood that the reverse of the operation just described will take place when, owing to a partial collapse of the governor-weights, the piston-valve $r^7$ is shifted to open communication with the cylinder P through the opposite port $P^4$. In such instance the gate-gear B will be driven in the opposite direction through the intermediacy of the pinion J, which would then be clutched to the shaft H through the operation of the racks N, actuated from the piston $O'$. The operation of the releasing devices and the like is the same as that hereinbefore described.

If the machine to be governed is employed for supplying an electric circuit, the promptness with which the governor will respond to variations in the load on said circuit will be increased by interposing in the electric circuit—e. g., the work-circuit of an electric railway—a magnet whose poles $z$ act upon the plate $y'$ as an armature, another magnet being interposed in the field-magnet circuit of the machine and having poles $z'$, which also act upon the plate $y'$ as an armature, but on the opposite side of the pivotal point thereof. It will be evident that any diminution of load in the external or load circuit will cause the magnet-poles $z$ to be weakened and the magnet-poles $z'$ to be strengthened, so that the effect will be to reinforce the action of the spring $y^4$, thereby lessening the tension of the spring $x^2$ upon the piston-valve $r^6$ and permitting the governor to shift the piston-valve more promptly, for the reason that the resistance to the spreading of the governor-weights is correspondingly diminished by the lessened tension of the spring.

Having thus described my invention, what I claim is—

1. In a governor, the combination with a rotatory shaft, of a pinion normally loose thereon, friction-disks on the pinion, friction-disks on the shaft at opposite sides of the pinion, and means for simultaneously bringing the pinion friction-disks and shaft friction-disks into clutching contact; substantially as described.

2. In a governor, the combination with a rotatory shaft, of a pinion normally loose thereon, a friction-disk on the pinion, a friction-disk on the shaft, a brake for normally preventing rotation of the pinion and means for clutching the disks together and simultaneously releasing the brake; substantially as described.

3. In a governor, the combination of a rotatory shaft of a pinion normally loose thereon, friction-disks on the pinion, friction-disks on the shaft at opposite sides of the pinion, a brake for normally preventing rotation of the pinion, said brake consisting of pivoted wings adapted to contact with the pinion-disks, and a wedge for separating said wings; substantially as described.

4. In a governor, the combination of a rotatory shaft, of a pinion normally loose thereon, friction-disks on the pinion, friction-disks on the shaft at opposite sides of the pinion, a brake for normally preventing rotation of the pinion, said brake consisting of pivoted wings adapted to contact with the pinion-disks, a wedge for separating said wings, and rack-bars geared to the shaft-disks, and having cams or inclines for raising the wedge; substantially as described.

5. In a governor, the combination with a gate-gear, of two parallel shafts, having loose pinions meshing with the gate-gear, friction-disks on the pinions, friction-disks on the shafts at opposite sides of the pinions, two pairs of rack-bars, said pairs being secured to oppositely-moving piston-heads, and disk-shifting mechanism geared to the rack-bars; substantially as described.

6. In a governor, the combination with a shaft-disk, of an externally-screw-threaded sleeve for shifting the disk, a screw-threaded socket within which the sleeve engages, said socket being provided with cog-teeth, and a rack-bar engaging the cog-teeth; substantially as described.

7. In a governor, the combination with a shaft-disk, of an externally-screw-threaded sleeve for shifting the disk, a screw-threaded socket within which the sleeve engages, said socket being provided with cog-teeth, a rack-bar engaging the cog-teeth, and a spring tending to retract the shaft-disk; substantially as described.

8. In a governor, the combination with a shaft-disk, of an externally-screw-threaded sleeve for shifting the disk, a screw-threaded socket within which the sleeve engages, said socket being provided with cog-teeth, a rack-bar engaging the cog-teeth, and a spring tending to retract the shaft-disk and connected to the screw-sleeve; substantially as described.

9. In a governor, the combination with a shaft-disk, of an externally-screw-threaded sleeve for shifting the disk, a screw-threaded socket within which the sleeve engages, said socket being provided with cog-teeth, a rack-bar engaging the cog-teeth, a spring tending to retract the shaft-disk and connected to the screw-sleeve through the intermediacy of a split collar, and a worm meshing with a gear on the periphery of the head of the screw-sleeve; substantially as described.

10. In a governor, the combination with the friction-disks, of two pairs of rack-bars for shifting them, pistons connected respectively to the pairs of rack-bars and having piston-rods sleeved the one upon the other, a cylinder within which the pistons work, and a spring for holding them normally apart; substantially as described.

11. In a governor, a power-cylinder, pistons therein, oppositely-rotating shafts, loose pinions on the shafts, a gate-gear intermeshing with said pinions, friction-clutches actuated from the pistons, and pop-valves for exhausting the cylinder; substantially as described.

12. In a governor, a power-cylinder, supply-ports leading into the same, said ports being provided with openings normally closed by valves, trippers for said valves, and a gate-stop for actuating the trippers, substantially as described.

13. In a governor, a power-cylinder, ports leading into the same, said ports being provided with openings normally closed by valves, trippers for said valves, and a gate-stop for actuating the trippers, said gate-stop, consisting of a rack actuated from the gate-shaft, a pinion meshing with the rack, a pinion-shaft, gearing driven thereby, and pivoted arms actuated by the gearing; substantially as described.

14. In a governor, valve-tripping mechanism comprising a gear driven from the gate-shaft, and having collars provided with projections and separated by an intermeshing space, swinging arms provided with projections entering the groove, and supplemental arms pivoted to the lower ends of the swinging arms; substantially as described.

15. In a governor, the combination with the power-cylinder, and its supply-ports, of valves for putting said ports into communication with the outer air, valves governing the admission of compressed air to the ports, and trippers for simultaneously unseating the exhaust-valves and seating the admission-valves; substantially as described.

16. In a governor, the combination with the power-cylinder, and the supply-ports, of the relief-valves comprising an inlet-valve for governing the admission of compressed air to the supply-ports, a secondary valve on the valve-stem of the inlet-valve, and a sleeve constituting a seat for the secondary valve and governing an exhaust-opening; substantially as described.

17. In a governor, the combination with the power-cylinder, and its supply-ports, of the relief-valves comprising an inlet-valve for governing the admission of compressed air to the supply-ports, a secondary valve on the valve-stem of the inlet-valve, a sleeve constituting a seat for the secondary valve and governing an exhaust-opening, and a spring for returning the sleeve to its original position; substantially as described.

18. In a governor, the combination with the power-cylinder, and the supply-ports, of the relief-valves comprising an inlet-valve for governing the admission of compressed air to the supply-ports, a secondary valve on the valve-stem of the inlet-valve, a sleeve constituting a seat for the secondary valve and governing an exhaust-opening, said sleeve being surrounded by an annular chamber, and a valve-chamber communicating with said annular chamber and having a valve adapted to be closed by a predetermined movement of the governor-stem; substantially as described.

19. In a governor, the combination with the main piston-valve, of a valve-casing moving in the same direction therewith, both the valve and casing being actuated from the governor-stem; substantially as described.

20. In a governor, the combination with the main piston-valve, of a spring-seated stem forming an abutment therefor, and means for adjusting the tension of the spring, said means comprising a swinging plate or arm, connected to a piston, another piston driven from the gate-shaft, and circulation-pipes between the piston-cylinders for moving the one piston with the other; substantially as described.

21. In a governor, the combination with the main piston-valve, of a spring-seated abutment therefor, and connections between the gate-gear and abutment, for increasing or diminishing the tension of the spring according as the gate-gear rotates in the one direction or the other; substantially as described.

22. In a governor, the combination with the main piston-valve, of a spring-seated abutment therefor, a collapsible air-chamber located in the penstock, a cylinder communicating with said air-chamber, and a piston for said cylinder, adapted to actuate the abutment to increase or diminish the tension of the spring; substantially as described.

23. In a governor, the combination with the main piston-valve, of a spring-seated abutment, an electric generator, an electric work-circuit, a magnet in said circuit, and an armature for the magnet, said armature being adapted by its movement to increase or diminish the tension of the spring; substantially as described.

24. In a governor, the combination with the main piston-valve, of a spring-seated abutment therefor, an electric generator, an electric work-circuit, a magnet in the field-coils of the generator, a magnet in the work-circuit, and an armature for said magnets connected to increase or diminish the tension of the spring; substantially as described.

25. In a governor, the combination with the main piston-valve, of a spring-seated abutment therefor, an electric generator, a magnet in the field-coils of the generator and an armature for said magnet connected to increase or diminish the tension of the spring; substantially as described.

In testimony whereof I affix my signature in presence of two witnesses.

ANDREW SCHULZE.

Witnesses:
JANE S. FAIR,
HUGH M. STERLING.